United States Patent Office 2,919,230
Patented Dec. 29, 1959

2,919,230

HYDROPHILIC BASE THERAPEUTIC COMPOSITIONS COMPRISING CATION-EXCHANGE RESIN

Francis M. Thurmon, Boston, Mass., assignor to Rohm & Haas Company, Philadelphia, Pa., a corporation of Delaware No Drawing. Application October 29, 1953
Serial No. 389,148

12 Claims. (Cl. 167—63)

This invention concerns therapeutic compositions comprising a hydrophilic base having dispersed therein purified cation exchange resin having carboxy radicals as the reactive functional part thereof. These compositions may be varied from relatively thick preparations which may be classed as ointments to relatively thin compositions which may be classed as creams or lotions, without any sharp line of demarcation. There may be considered as ointments semi-solid or paste-like compositions of greater or smaller viscosity while lotions are definitely fluid. In any type of preparation the hydrophilic base is more viscous than water itself. The compositions of this invention are medicinal or therapeutic remedies which may be applied by smearing or spreading on wounds, abrasions, infected areas, or other areas which it is desired to treat. The ointments comprise a gelatinous aqueous paste or an ointment base having water in the external phase, said paste or base having dispersed therein a finely divided carboxylic cation exchange resin. The lotions comprise a suspension of such resin in a hydrophilic liquid which contains water or which is miscible with water, the liquid having sufficient body or viscosity to give good application properties. The composition may contain in addition to the carboxylic cation exchange resin, which is an essential active component, one or more drugs or other therapeutically active agents.

The general object of this invention is to provide compositions varying in form from ointment to lotion which, when topically applied or applied to surfaces of the body, restore, adjust, or maintain acidity. Acidity is a normal characteristic of skin. When skin is broken, removed, or destroyed, the damaged area develops alkalinity. In some cases body surfaces become alkaline from the presence of or contamination with some foreign material. Changes in pH of the skin are also observed in various diseased conditions. Deviations from the normal pH of the epidermis tend to permit or favor growth of organisms which would scarcely occur upon or in the body surfaces. It is now found that body surfaces may be maintained at or restored to normally acidic conditions and growth or reproduction of acid-sensitive organisms at the body surfaces may be prevented, destroyed, or inhibited by application thereto of a composition containing a cation exchange resin having carboxy radicals (—COOH) as the reactive functional group thereof, said resin being dispersed in a hydrophilic carrier which is therapeutically acceptable in dermatological practice and which is more viscous than water. The cation exchange resins which are used give a pH in suspension in an aqueous 0.15 N salt solution between about 3 and about 5.5, best from 3.5 to 5.

Invading organisms may be bacteria or fungi or both or viruses. The compositions of this invention provide effective action against various members of any or all of these classes. The carboxylic resins absorb various metabolic products, or toxins, or decomposition products resulting from invasions of various types of organisms. They have been found to prevent and absorb odors when applied to body surfaces. The compositions supply a soothing action and application of compositions here-described usually brings a distinct sense of comfort to inflamed or diseased areas and yet they have not been observed to produce chemical venenata. Furthermore, the compositions based on a defined carboxylic exchange resin may include drugs, particularly those having a basic substituent by which they are held to the resin until needed and are then effectively released.

The resinous exchangers which are an essential, active ingredient in the compositions of this invention are characterized by the presence therein of the carboxyl radical, —COOH, as the essential functional group. These exchangers are insoluble resins, yet they act as though they were readily available reagents in solution. They can take up cations and supply hydrogen ions. They have absorptive capacities for materials over and above their capacity for ion exchange.

The exchange resins having carboxyl groups are prepared from carboxylic acids (or their anhydrides) which have an unsaturated linkage through which they enter into copolymers or heteropolymers with other compounds having polymerizable unsaturated linkages.

The copolymer or heteropolymer is rendered insoluble by including a polymerizable substance having at least two double bonds which are not conjugated. For example, as is well known, maleic anhydride and styrene can be polymerized together, and when there is also used an unsaturated compound having at least two non-conjugated double bonds, an insoluble resin results. This polyunsaturated compound may be one such as divinylbenzene, trivinylbenzene, ethylene diacrylate, ethylene dimethacrylate, divinyl ether, diallyl maleate or fumarate or itaconate, or similar polymerizable substance. Such polyunsaturated compounds cause cross-linking, the extent of which can be varied with consequent differences in properties of the final resins. Another source of carboxylic exchangers is based on copolymerization of acrylic or methacrylic acid and a polyunsaturated polymerizable substance, such as named above. The carboxy-containing copolymers or heteropolymers are formed in the conventional way with the aid of a free radical catalyst or initiator, such as benzoyl peroxide, lauroyl peroxide, tert-butyl perbenzoate, tert-butylhydroperoxide, etc. The carboxylic resins must be purified for purposes of this invention by removing any free monomeric materials in the polymeric product. It is also necessary that any inhibitor which may have been present in the monomeric starting materials and that if catalyst or initiator remains, it be removed. Furthermore, under some conditions of copolymerization there may be salts or other extraneous substances present. These various impurities are removed by one or more suitable steps which include distilling under low pressure or with steam, extracting with solvents, including water, saturating with metal cations and regenerating with acid, and washing the resin thoroughly with deionized water. If acid anhydride groups were present in the copolymer as prepared, they are converted to carboxylic groups as by treating with aqueous acid or aqueous alkali solution and regenerating with acid solution. If a salt form was present, it is, of course, converted to the hydrogen form by treating with an aqueous acid solution. Although this invention is not directed to a process of purifying carboxylic resins, processes for doing this being within the skill of the art, it must be pointed out that for purposes of the claimed invention it is necessary that purified or refined carboxylic resins be employed. The term purified or refined carboxylic resins or similar term is used to show that these resins are essentially free or monomeric materials, catalysts, activators, redux agents, inhibitors, salts, and other extraneous materials which are inevitably present in the copolymers as they are first formed, the exact nature and proportions of wihch depend upon the choice of starting materials and the mode and conditions of copolymerization.

The resin formed may be crushed to a fine powder. It is generally desirable that the particle size be less than 100 mesh and it is preferable that the bulk of the powdered resins pass a 325 mesh screen. The insoluble carboxylic resins may also be formed by emulsion polymerization and then precipitated as fine particles, which may be used as such or crushed to a still finer form. The pH of the purified resins may, if necessary, be adjusted by adding sufficient basic material to bring a resin of too low pH within the prescribed range of pH. This may be done by adding a small proportion of an alkaline reagent, such as sodium hydroxide or carbonate or of a drug having basic properties. Presence of some groups in salt-form is permissible, the remaining carboxylic acid groups still functioning. Similarly, some of the carboxyl groups may be converted to the salt-form with an inorganic cation having therapeutic value, such as copper or zinc. Ion exchange resins which have mixed sulfonic and carboxylic groups may be similarly used when the sulfonic group is in salt-form, such as a sodium, calcium, magnesium, copper, or zinc salt, or in the form of a salt of an amine, the free carboxyl groups supplying hydrogen ions.

Most of the purified carboxylic resins in acid form have a level of acidity which permits their use directly in the compositions of this invention. As has been stated above, where more strongly acidic groups are present, these are best converted to a salt form and the resin brought to the effective pH range. This range is between pH values of about 3 and about 5.5, best from 3.5 to 5, as determined with a suspension of resin in a physiologically normal salt solution. For purposes of this invention pH is determined for a suspension of about one gram of resin in 25 ml. of an aqueous 0.15 N salt solution. Sodium or potassium chloride may be used as the salt. Since the solution is isotonic, it has significance with respect to conditions apt to be encountered in the practical application of the compositions of this invention.

The compositions of this invention should be composed of at least 2% by weight of a carboxylic cation exchange resin and this resin may make up as much as about 35% of the compositions. For some purposes the range of 5% to 35% or somewhat more is particularly useful. With larger percentages difficulties arise in that some compositions, particularly ointments, become too stiff for proper application. With some liquid carriers, however, somewhat more than 35% of resin may be used. The usually preferred range of carboxylic exchanger in the compositions is from 10% to 25%, the optimum concentration being 15% to 25%. On the other hand in applications on tender skins concentrations from 2 to 10% may be most useful. The concentration of resin will depend on the particular resin, the vehicle, and the intended application.

The rest of the composition comprises a hydrophilic base. This may be an ointment base in which the external phase contains water, as in the case of the oil-in-water emulsions which are commonly used as bases. There may also be used gums for thickening aqueous suspensions or dispersions of a carboxylic resin or merely a hydrophilic liquid, such as glycerine or glycerine and water. In any case the vehicle is one which is more viscous than water and one which is acceptable or recognized as suitable for dermatological applications. The vehicles or carriers may, therefore, be identified as dermatologically useful or accepted carriers which are more viscous than water.

The function of the hydrophilic base is to improve the application properties of the carboxylic resins and to increase their effectiveness. The base provides a medium in which the finely particled carboxylic exchange resins are dispersed. The dry resins themselves are not readily wettable or dispersible and usually possess properties which work against their proper application to body surfaces. The hydrophilic base overcomes these properties and provides wet, dispersed particles which are hydrated and swollen and which act rapidly and efficiently with controlled activity over prolonged periods of time. The ointments are particularly useful for treating dry, scaly conditions, acting as both softeners and carriers.

The ointment bases may be made with stearic acid, waxes, spermaceti, cetyl alcohol, lanolin, oils, or the like dispersed in an aqueous medium with ethanolamine soaps, glyceryl monolaurate, glycol monolaurate, glyceryl monostearate, or other emulsifying and dispersing agents. The base may contain organic compounds such as glycerine, ethoxyethoxyethanol, or sorbitol, etc., and also preservatives and perfumes, if desired.

Solutions of such gums as tragacanth, karaya, quince seed gum, Irish moss, pectin, alginates, cellulose ethers, polyethylene glycols, etc. may likewise be used. Compositions may be formed in which such gummy substances are used in conjunction with the oils and waxes of the ointment bases above. The well known starch-glycerine pastes may also be used, or methyl cellulose-glycerine pastes, or the like. When greasy materials are to be avoided, bentonitic bases have been suggested but these must be adjusted to the pH range of the carboxylic resins which are used in this invention. This requires the removal of some of the metal cations which render normal bentonite alkaline without resorting to the extreme acidity which is exhibited by the complex hydrous silicates which result from removing all metal cations from bentonite with the aid of sulfonic acid exchange resins or by thorough electrodialysis.

A typical ointment base (I) may be prepared from 30 parts of glyceryl monostearate (self-emulsifying grade), 30 parts of glyceryl laurate, 60 parts of stearic acid, 300 parts of water, perfume, and preservative (such as a mixture of propyl and methyl p-hydroxybenzoate at 0.05%). Another suitable base (II) is made from 15 parts of cetyl alcohol, one part of paraffin wax, 10 parts of propylene glycol, 2 parts of sodium dodecyl sulfate, and 72 parts of water. Yet another typical base (III) is made from 250 parts of cetyl alcohol, 250 parts of white mineral oil, 120 parts of propylene glycol, 10 parts of emulsifying agent, 0.25 part of methyl p-hydroxybenzoate, 0.15 part of propyl p-hydroxybenzoate, and 370 parts of water.

As examples of the use and effect of compositions containing purified carboxylic resins, ointments were prepared, each of which contained 25% of a cation exchange resin from copolymerization of methacrylic acid and divinylbenzene dispersed in an ointment base. This resin has a pH of about 3.5. These ointments were applied to skin which had been lathered with shaving soap and rinsed with water. The pH of the skin was determined just after the soap had been rinsed off and later after the ointment was rinsed off. In every case the pH was reduced to a normal value.

A skin, for example, found to have a pH of 10 directly after removal of shaving soap, was smeared with resin-containing ointment from Base III above. The ointment was rinsed off ten minutes after its application. The pH of the skin was then 6.3. In another test the pH's were 8.5 and 4.9 respectively with a ten-minute period of treatment. In another test after the soap was rinsed off, the pH was 8.4 and after a treatment for one minute with ointment 5.2.

In tests with ointment using Base I a pH of 8.5 was determined after the soap had been rinsed off and a pH of 4.9 after a ten-minute application of the ointment. In another test a pH of 8.8 was found initially and after a five-minute application of ointment a pH of 5.3.

Tests were made with an ointment consisting of 25% of the above carboxylic exchange resin and 75% of a base made by dissolving 2 parts by weight of water-soluble methyl cellulose in 100 parts of water and 10 parts of glycerine with 0.01 part of sodium benzoate. From a pH of 8.6 after soap had been applied there was observed a reduction to a pH of 4.8 one minute after application of the ointment. A comparable reduction (8.7 to 5.0) was obtained one minute after application of an ointment with an aqueous solution of polyethylene glycol as a base.

An abraded skin surface was found to have a pH of 7.44, an optimum condition for growth of fungi and bacteria. It was coated with an ointment containing 20% of a purified, hydrated carboxylic exchanger giving a pH of 4 and having carboxyl groups from acrylic acid units in an insoluble copolymer dispersed in Base II above. The pH of the abraded area was determined fifteen minutes later as 5.5.

A case of intertriginous dematitis of the toes in which the surface condition gave a pH of 7.4 was treated with an ointment containing 75% of a hydrophilic ointment base and 25% of a finely powdered, purified cation exchanger prepared from methacrylic acid, styrene, and divinylbenzene, this resin having a pH of about 3.5. The resin was washed with water and drained before being mixed with the ointment, a step which favors the stability and utility of the preparations of this invention. Good therapeutic results were obtained within four weeks, the surface being kept below pH 7 and the infection being effectively controlled, pain and irritation being relieved with normal growth proceeding.

A typical lotion base is made by warming 50 parts of a 2% quince seed mucilage and adding thereto a warm mixture prepared by combining 5 parts of glycerine, 0.3 part of triethanolamine, 3.4 parts of alcohol, and 39 parts of water and mixing this with another heated mixture of 1.2 parts of stearic acid, 0.3 part of ricinoleic acid, 0.5 part of sweet almond oil, and 0.3 part of glyceryl monostearate. To 80 parts of the resulting preparation there is added 20 parts of a hydrated, powdered, purified cation exchange resin in which carboxyl radicals supply the functional portion and impart a pH of about 4. This composition is typical of useful "pat on" lotion or creams.

The dispersions of finely divided, purified or refined carboxylic cation exchange resins in the defined hydrophilic bases are useful in the treatment of seborrhoic and eczematous dermatitis and in the control of diaper rash.

The compositions comprising a carboxylic acid ion exchange resin dispersed in a hydrophilic base may contain one or more therapeutic agents which are directed toward the correction of specific ailments or of infections of body surfaces or which give other desired actions.

For example, the carboxylic acid exchanger may be supplemented with 1% to 3% of salicylic acid, or 2% to 6% of benzoic acid, or 5% to 10% of tannic acid. Where sulfur therapy is indicated, 1% to 6% of finely divided sulfur is helpful. The compositions may contain 1% to 2% of phenol or 1% to 3% of resorcinol. Surface anesthestics may be added, such as benzocaine, butacaine, procaine, etc. Addition may be made of camphor, menthol, eucalyptol, or methyl salicylate. Where a germicidal and anti-pruritic effect is desired, 5% to 10% of oil of cade may be used in the ointments or lotions. Sulfathiazole or other sulfanilamides may be used. There may also be compounded ointments or lotions containing antibiotics, such as streptomycin, penicillin, tyrothricin, aureomycin, or subtilin; antihistamines, such as N-$\alpha$-pyridyl - N - benzyl-N',N'-dimethylethylenediamine; vasoconstrictors, such as naphthylmethyl imidazoline hydrochloride; or a vasodilator, such as belladonna. Inorganic agents such as zinc oxide, calamine, calomel, and white precipitate may be used when called for and also astringents. These are releasable at a controlled rate, although many other types of ion exchange resins do not permit this on the body surfaces.

The compositions which contain a carboxylic exchanger dispersed in a hydrophilic base together with a therapeutically active compound having a basic group, such as an amino group, are of peculiar interest. Many of the surface anesthetics and antibiotics contain such a basic group. Through this group the active compound is bound to the carboxylic resin but is displaced therefrom through cation exchange at the locus where the active compound is needed. The exchanger thus serves several interrelated purposes. Usually from 0.2% to 5% of a basic nitrogen-containing drug can be used in a composition of this invention.

An ointment of this ytpe may be prepared from a base, such as shown above, with 25% of a purified carboxylic exchanger and 2% of butacaine or 1% of procaine. In addition, 3% to 5% of adrenalin hydrochloride may be incorporated. These agents are slowly released at controlled rates locally and, therefore, give a prolonged effect.

A composition is prepared from 25 parts of a purified carboxylic exchanger from methacrylic acid and divinylbenzene, 3 parts of salicylic acid, 13 parts of sulfur, and 75 parts of a hydrophilic base. This preparation is effective, for example, against seborrhoic dermatitis.

A composition useful in dermatomycotic infections is prepared from 2 parts of undecylenic acid, 3 parts of the zinc salt of a carboxylic resin from maleic acid, styrene, and divinylbenzene, 20 parts of an insoluble carboxylic exchange resin in its hydrogen form from acrylic acid and divinylbenzene, which resin was purified by distillation, extraction, conversion to its sodium form, regeneration to the acid form, and thorough washing, and 75 parts of a hydrophilic ointment base, such as one from cetyl alcohol 18 parts, polyglycol wax 10 parts, glycerine 10 parts, non-ionic emulsifiers (octylphenoxypolyethoxyethanols) 4 parts, and water 48 parts.

A composition useful for treating bacterial infections of the skin is prepared from 1 part of the streptomycin salt form of a purified methacrylic acid-divinylbenzene carboxylic exchanger (containing 50% of streptomycin), 14 parts of the same exchanger in its hydrogen form, and 85 parts of a hydrophilic ointment base, such as that prepared from methyl cellulose 5 parts, glycerin 10 parts, and water 85 parts.

The effect of a composition containing a purified carboxylic acid exchanger dispersed in a dermatologically accepted hydrophilic base is to restore, adjust, or maintain the normal pH of the body surface. This effectively destroys, inhibits, or prevents growth of acid-sensitive pathogenic organisms on these surfaces. Toxins and decomposition products or metabolic products of pathogenic organisms and tissue are absorbed. The preparations here described usually give prompt relief, promoting comfort, and accelerating healing and return to a normal healthy state. The compositions of this invention are effective whether they utilize a finely divided carboxylic resin of the defined pH as the sole active agent or the combination of such resin and a conventional therapeutic agent. In either case the resin is in a hydrated, swollen form dispersed in an ointment, paste, cream, or lotion, herein summarized by the expression therapeutically acceptable carrier which is extendable with water and which is more viscous than water.

This application is a continuation-in-part of my application Serial No. 187,356, filed September 28, 1950, now abandoned.

I claim:

1. As a new composition of matter, a therapeutic preparation for external application which comprises a therapeutically and dermatologically acceptable hydrophilic carrier which is miscible with water, which is more viscous than water, and which has dispersed therein discrete finely divided particles of a purified, acidic cation-exchange resin having carboxylic groups as the functional portion thereof and giving a pH between about 3 and about 5.5.

2. As a new composition of matter, a therapeutic preparation for external use which comprises a hydrophilic, therapeutically and dermatologically acceptable carrier for dermatological applications, which is more viscous than water, which is miscible with water, and which has dispersed therein discrete finely divided particles of a purified carboxylic cation exchange resin giving a pH between about 3 and about 5.5, the said resin constituting about 2% to about 35% by weight of the preparation.

3. As a new composition of matter, a therapeutic preparation for external use which comprises a hydrophilic therapeutically and dermatologically acceptable ointment base having dispersed therethrough particles of a purified, acidic cation exchange resin which has carboxylic groups as the functional portion thereof and which gives a pH of about 3.5 to about 5, the said particles being less than 100 mesh in size and constituting between 5% and 35% by weight of the preparation.

4. As a new composition of matter, a therapeutic preparation for external use which comprises a hydrophilic therapeutically and dermatologically acceptable ointment base having dispersed therethrough finely divided particles of a purified carboxylic cation exchange resin giving a pH of about 3.5 to about 5, the bulk of the said particles passing a 325 mesh screen and constituting 10% to 25% by weight of the preparation.

5. As a new composition of matter, a therapeutic preparation for external application which comprises a hydrophilic therapeutically and dermatologically acceptable ointment having dispersed therethrough finely divided particles of a purified carboxylic cation exchange resin giving a pH between about 3 and about 5.5 and carrying a drug, the said particles being less than 100 mesh in size and the resin constituting 2% to 35% by weight of the preparation.

6. As a new composition of matter, a therapeutic preparation for external application which comprises a hydrophilic therapeutically and dermatologically acceptable ointment containing a drug and having dispersed therethrough finely divided particles of a purified, acidic cation exchange resin having carboxylic groups as the functional portion thereof and giving a pH of 3.5 to 5, the said particles constituting about 10% to about 25% by weight of the preparation and being less than 100 mesh in size.

7. As a new composition of matter, a therapeutic preparation for external application which comprises a hydrophilic ointment base comprising a dispersion of oleaginous material in an aqueous medium and a dispersion therein of a purified carboxylic cation exchange resin in acidic form giving a pH of 3.5 to 5, having a particle size less than 100 mesh, and constituting between 5% and 35% by weight of said preparation.

8. As a new composition of matter, a therapeutic preparation for external application which comprises a hydrophilic therapeutically and dermatologically acceptable ointment having dispersed therein finely divided particles of a purified carboxylic cation exchange resin giving a pH between about 3.5 and about 5 and carrying a surface anesthetic, the said particles being less than 100 mesh in size and the resin constituting 5% to 35% by weight of the preparation.

9. As a new composition of matter, a therapeutic preparation for external application which comprises a hydrophilic therapeutically and dermatologically acceptable ointment having dispersed therein finely divided particles of a purified carboxylic cation exchange resin giving a pH between about 3.5 and about 5 and carrying an antibiotic, the said particles being less than 100 mesh in size and the resin constituting 5% to 35% by weight of the preparation.

10. As a new composition of matter, a therapeutic preparation for external application which comprises a therapeutically and dermatologically acceptable, thickened aqueous paste having dispersed therethrough finely divided particles of a carboxylic cation exchange resin giving a pH between about 3 and about 5.5, having a particle size less than 100 mesh, and forming 2% to about 35% by weight of the said preparation.

11. As a new composition of matter, a therapeutic preparation for external application which comprises a dermatologically and therapeutically suitable liquid carrier which is more viscous than water, which is miscible with water, and in which there are dispersed discrete particles of a carboxylic cation exchange resin giving a pH between about 3 and about 5.5, having particles less than 100 mesh in size, and constituting between 5% and 35% by weight of the preparation.

12. The composition of claim 11 in which the major part of the resin passes a 325 mesh screen.

References Cited in the file of this patent

UNITED STATES PATENTS 2,501,927    Block ---------------- Mar. 28, 1950

OTHER REFERENCES

J.A.P.A., Prac. Pharm. ed., October 1942, pp. 340–343.
Weidman: J.A.M.A., July 1945, pp. 805–811.
Am. J. Pharmacy, November 1947, vol. 119, pp. 393–394.